United States Patent
Storey

(10) Patent No.: US 7,128,437 B2
(45) Date of Patent: Oct. 31, 2006

(54) TEMPERATURE ACTIVATED PRESSURE RELIEF MECHANISM FOR FLASHLIGHTS AND BATTERIES

(75) Inventor: William T. Storey, Dalmatia, PA (US)

(73) Assignee: W. T. Storey, Inc., Dalmatia, PA (US)

( * ) Notice: Subject to any disclaimer, the term of this patent is extended or adjusted under 35 U.S.C. 154(b) by 170 days.

(21) Appl. No.: 10/981,200

(22) Filed: Nov. 3, 2004

(65) Prior Publication Data

US 2006/0092631 A1  May 4, 2006

(51) Int. Cl.
F21V 25/10 (2006.01)
F21L 4/00 (2006.01)
H01M 2/12 (2006.01)

(52) U.S. Cl. .................. 362/208; 362/158; 362/267; 429/53

(58) Field of Classification Search ............. 362/208, 362/158, 267, 276; 429/53, 61, 62
See application file for complete search history.

(56) References Cited

U.S. PATENT DOCUMENTS

| 3,007,110 A | * | 10/1961 | Rosenstrach ............. 324/506 |
| 4,237,526 A | | 12/1980 | Wood |
| 5,003,440 A | | 3/1991 | Maglica |
| 5,113,326 A | | 5/1992 | Maglica |
| 5,349,507 A | | 9/1994 | Parker |
| 5,904,414 A | | 5/1999 | Monteleone et al. |
| 5,939,217 A | * | 8/1999 | Tamura et al. .............. 429/7 |
| 6,012,824 A | * | 1/2000 | Sharrah et al. ............ 362/199 |
| 2003/0041899 A1 | * | 3/2003 | Frank ........................ 137/74 |

OTHER PUBLICATIONS

Eveready Battery Company., Lithium/FeS2 Application Manual, 2003, pp. 1-12.
Alchemy Castings, lead castings, lead products, lead services, May 26, 2004, pp. 1-4.

* cited by examiner

Primary Examiner—Alan Cariaso
(74) Attorney, Agent, or Firm—Thomas R. Shaffer

(57) ABSTRACT

A temperature activated pressure relief mechanism for a flashlight or other battery containing device includes a watertight sealed flashlight housing which has an opening which extends from an outer surface to and inner surface of the housing. A metallic eyelet having an eyelet opening and having a cylindrical body sized to fit is placed tightly into the housing opening. A fusible plug of a suitable alloy material placed into said eyelet opening so that when said alloy material reaches the alloy melting point, said material will melt and flow at least partially out of the eyelet opening allowing gas pressure from within the sealed flashlight housing to vent to outside the sealed housing through the eyelet opening.

26 Claims, 2 Drawing Sheets

TEMPERATURE ACTIVATED PRESSURE RELIEF MECHANISM FOR FLASHLIGHTS AND BATTERIES

BACKGROUND OF THE INVENTION

1. Field of the Invention

The present invention relates to a temperature activated pressure relief mechanism for flashlights and other sealed battery operated devices and for batteries. More specifically, it relates to a temperature activated pressure relief mechanism which prevents explosion of a battery or sealed flashlight containing a battery which is exposed to a high temperature environment such as a fire.

2. Description of the Prior Art

It is well known that many types of batteries emit flammable or explosive gas. Because of this, many flashlight designs include gas vents, membranes or one-way valves to allow the discharge of such gas from a sealed flashlight container. It is even a specific requirement of an Underwriters Laboratory standard, namely, UL STD 913 on apparatus for use in hazardous environments which requires (18.1.3) "Compartments containing batteries which emit flammable gas shall be ventilated to prevent accumulations of ignitable concentrations." Battery or equipment manufacturers realize that in normal operation dangerous ignitable concentrations of gas (e.g. hydrogen or methane) may build up and thus vents are known to prevent such build up.

Montelcone et al., U.S. Pat. No. 5,904,414, for example, provides a membrane to seal a vent port in the battery housing that permits flammable gas generated by the batteries within the housing to continuously escape. Wood, U.S. Pat. No. 4,237,526, provides a gas discharge vent assembly into a battery operated device which includes an aperture and a porous diffusion member.

Parker, U.S. Pat. No. 5,349,507, provides a flashlight with a complex mechanical pressure relief valve and Maglica, U.S. Pat. No. 5,113,326, and Maglica, U.S. Pat. No. 5,003,440, each provide flashlights which include a one way valve or seal to allow venting of overpressure of the interior of the flashlight.

Thus, it is well known to continuously vent pressure from a sealed battery container which is designed to operate with batteries which continuously produce flammable or explosive gas.

However, there are also other types of batteries, such as for example, lithium-iron disulfide batteries, which do not produce or emit any significant quantities of flammable or explosive gas under normal operating conditions which might pose a safety risk which would require continuous venting. Even though sealed devices which utilize such non-gas producing batteries do not require venting under normal operating conditions, venting would be required if the battery temperature becomes high enough to cause internal pressure to develop. The present invention is concerned with this latter type of battery and sealed containers therefor and is not concerned with sealed containers for gas producing batteries.

A potential problem which has not been adequately addressed in the past is that even the safer non-gas producing batteries may under extreme conditions, such as a fire or very high temperatures, develop high pressures and explode. To avoid this potential problem, most (but not all) sealed modern batteries are designed to open a vent in the battery itself at a certain temperature to relieve the internal pressure.

The existing flashlight vents, valves and permeable membranes are overly complex, potentially unreliable and overly expensive to employ and are not necessarily designed to function in this type of extreme high temperature situation.

SUMMARY OF THE INVENTION

There remains a need for a sealed flashlight which is essentially impervious to water so that it can be used at significant depths but which will permanently and dependably open a reliable low cost and simple fusible plug vent at a temperature below that at which the internal battery vent opens so that the flashlight itself does not become a containment vessel that might burst in a fire from the gas pressure released by the battery.

The simple fusible plug vent of the present invention, while intended for use primarily in a flashlight housing or other sealed battery container, may also be employed as the vent for the battery itself. In this case, the flashlight housing would include an additional fusible plug of a lower melting point than that of the battery.

In its simplest form, the present invention provides a flashlight or a battery or some other sealed battery operated device with a temperature activated pressure relief mechanism which includes a) a watertight sealed housing, said housing having an outer surface and an inner surface, said housing having a housing opening which extends from said outer surface to said inner surface; b) a metallic eyelet having a cylindrical body sized to fit and placed tightly into said housing opening, said cylindrical body having an eyelet opening; and c) a fusible plug of a suitable alloy material placed into said eyelet opening whereby when said alloy material reaches the alloy melting point, said material will melt and flow at least partially out of said eyelet opening allowing gas pressure from within the sealed housing to vent to outside the sealed housing through said eyelet opening.

Preferably, said eyelet has a flange portion which rests tightly upon said outer surface. Preferably, said metallic eyelet is formed of copper.

Preferably, said housing includes a stainless steel end cap pressed into said housing and sealed with a silicone sealant, into which cap said opening is provided. Preferably, said eyelet is sealed to said housing with a non-corrosive sealant selected from the group comprising: anaerobic sealants (such as Locktite™); epoxies; solvated plastics; and polysulfides.

Preferably, said eyelet is secured to said housing by a press fit whereby no adhesive is needed.

Preferably, said alloy has a melting temperature of approximately 100 degrees Celsius when utilized with a Lithium/Iron Disulfide (Li/FeS2) "Energizer L91" battery.

Preferably, said alloy consists essentially of Bismuth (Bi), Lead (Pb) and Tin (Sn). Preferably, said alloy consists of approximately 52.5% by weight of Bismuth (Bi), 32% by weight of Lead (Pb) and 15.5% by weight of Tin (Sn).

Preferably, said alloy is selected on the basis of the type of batteries which are being used in the housing whereby an alloy is selected which will melt below the maximum temperature to which the battery may be safely heated.

Preferably, said eyelet opening has a diameter of approximately 1/16 inch which in many applications will be effective and have the lowest cost.

DETAILED DESCRIPTION OF THE PREFERRED EMBODIMENTS

Figure 2:
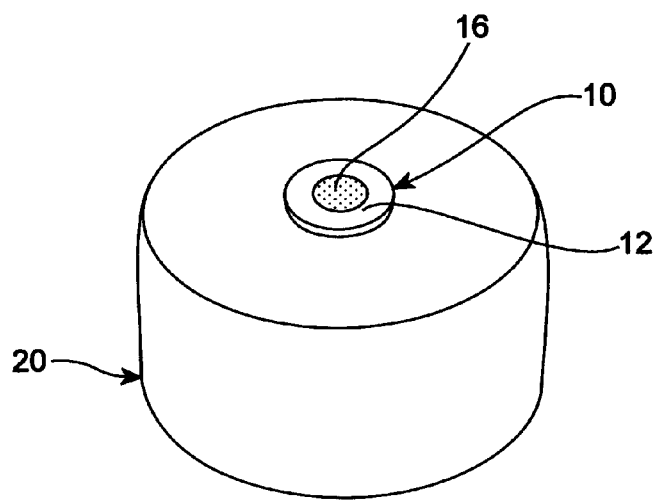
FIG. 2 is a perspective view of an end cap having an eyelet and a fusible plug.
Figure 1:
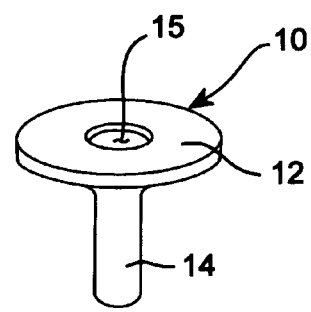
FIG. 1 is a perspective view of a eyelet of the present invention.
Figure 3:
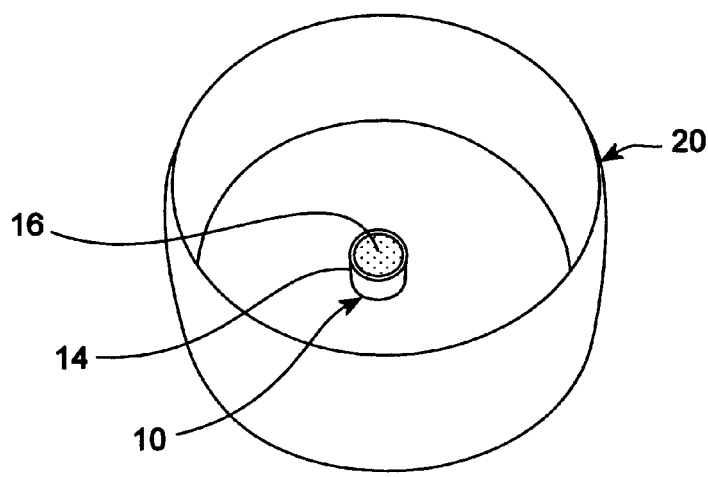
FIG. 3 is a perspective view of an end cap having an eyelet and a fusible plug.
Figure 5:
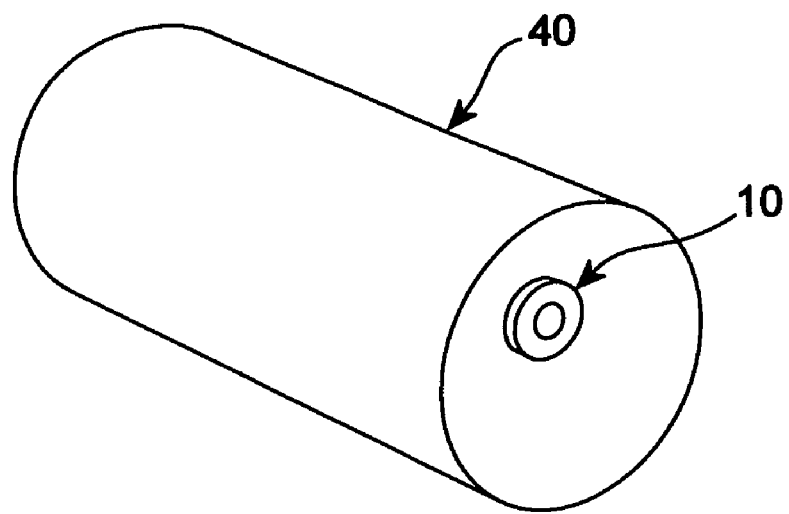
FIG. 5 is a perspective view of a battery housing having a fusible plug.

Referring to FIGS. 1–3, a copper eyelet 10 which has a stem portion 14 and a flange portion 12 is shown. An eyelet opening 15 extends from the center of the flange portion 12 through the stem portion 14.

Figure 4:
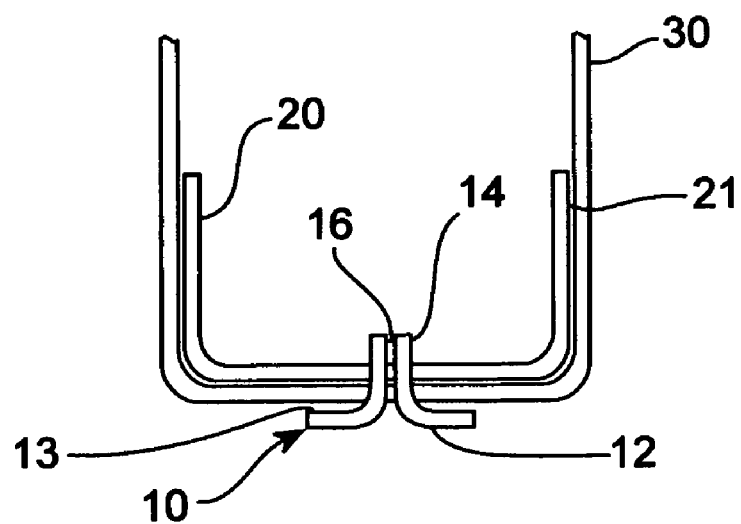
FIG. 4 is a cross sectional view of a flashlight housing including an end cap having a fusible plug.

Referring to FIGS. 2–3, an eyelet is shown after it has been pressed and fit into a stainless steel end cap 20. In FIG. 4, a flashlight housing 30 is shown which includes a stainless steel end cap 20 pressed into said housing and sealed with a silicone sealant 21.

The eyelet 10 is sealed to said housing with a non-corrosive sealant 13 selected from the group comprising: anaerobic sealants (such as Locktite™); epoxies; solvated plastics; and polysulfides. Locktite is presently preferred although any of these materials will function as sealant as the press fitting operation provides a tight fit which avoids the need for an adhesive material.

Opening 15 of eyelet 10 is filled with an alloy material 16 which consists of approximately 52.5% by weight of Bismuth (Bi), 32% by weight of Lead (Pb) and 15.5% by weight of Tin (Sn). This alloy provides a melting point of approximately 100 degrees Celsius which is an appropriate melting temperature when using a Lithium/Iron Disulfide (Li/FeS2) "Energizer L91" battery which has a pressure relief vent designed to operate at between 120 and 130 degrees Celsius. Obviously, different alloy melting temperatures and thus alloy compositions will need to be selected for different batteries. A melting point for the alloy should be selected at a temperature below the activation point of any pressure relief vent of the battery so that the flashlight housing vent will be melted and open when the battery vent is activated and an explosion will be prevented.

The diameter and length of the eyelet can be calculated and designed once a battery is selected. One skilled in the art, knowing the design venting temperature for the battery to be used, will first select a eutectic alloy with a melting point below the opening point of the battery vent.

Next, it is necessary to calculate or test to find the minimum size opening required to vent the gases under a rapid pressure rise. In this regard, old tests run on plugged rifle barrels filled with black powder with a small fuse hole indicate a relatively small hole (i.e. about 1/16") will generally work and have been found to be satisfactory for typical battery pressure increases due to temperature rises of Energizer L91 Batteries.

Then, using the shear strength of the alloy (generally for these alloys about 300 psi) it is necessary to calculate the thickness required for the diameter of the vent hole for maximum pressure that the flashlight will be subject to under water.

As an example, with the Energizer L91 AA lithium battery, the Energizer application manual states that "Pressure Relief Vent—Operates at 120–130 C." (see: http://data.energizer.com/batteryinfo/application_manuals/l91/l91.htm) Therefore, a low melting point or eutectic alloy of around 100 C is selected. (see http://www.indium.com/products/physicalproperties.php and go to "View the Physical Properties Tables"). From this table, Indalloy alloy number 42 is selected which has a melting point of 96 C which is well below the L91's vent opening temperature. This alloy was also selected as it has multiple suppliers, has no Cadmium (desirable), no Indium (and thus the eyelets will not need to be nickel plated) and has less Lead than other alloys (minimal Lead is environmentally desirable). Next, a careful study of Indium Corporation's product information (a fusible alloy supplier—see http://www.indium.com/products/fusiblealloys.php) shows this alloy has a safe sustained shear load of 300 psi which is a typical value for shear strength of fusible alloys self-soldered in an eyelet.

The following is a typical calculation using commonly available 0.071" Copper (the above alloy solders to Copper and Indium containing alloys do not solder well to Copper) eyelets. The present invention is preferably going to be used on a flashlight housing which will be pressure tested to 175 psi (which is equivalent to approximately 400 feet deep water said depth being three times the 130 feet of water or the maximum for ordinary Scuba diving) the force (with a safety factor of 4) on the alloy in the eyelet of 175 psi×pi×0.071 in.×0.071 in. which equals pi×0.882 lbs. The force (with a safety factor of 4) at which the eyelet will yield is pi×t (thickness of alloy in inches.)×0.071 in×300 psi which equals 21.3×pi×t lbs. Setting the force applied equal to the minimum force (with a safety factor of 4) at which the alloy plug will yield gives: 0.882 lbs×pi=t×21.3 lbs×pi or t (in) equals 0.882/21.3 in. Thus, the minimum alloy 42 thickness required for a 0.071 in. eyelet is 0.0414 in. thickness.

Such an engineering analysis will be well understood to those of ordinary skill in the art in selected appropriate eyelets and alloy types for other batteries.

While I have shown and described the presently preferred embodiment of our invention, the invention is not limited thereto and may be otherwise variously practiced within the scope of the following claims:

I claim:

1. A flashlight with a temperature activated pressure relief mechanism comprising:
   a) a watertight sealed flashlight housing, said housing having an outer surface and an inner surface, said housing having a housing opening which extends from said outer surface to said inner surface;
   b) a metallic eyelet having a cylindrical body sized to fit and placed tightly into said housing opening, said cylindrical body having an eyelet opening; and
   c) a fusible plug of a suitable alloy material placed into said eyelet opening whereby when said alloy material reaches the alloy melting point, said material will melt and flow at least partially out of said eyelet opening allowing gas pressure from within the sealed flashlight housing to vent to outside the sealed housing through said eyelet opening.

2. A flashlight with a temperature activated pressure relief mechanism according to claim 1 wherein said eyelet has a flange portion which rests tightly upon said outer surface.

3. A flashlight with a temperature activated pressure relief mechanism according to claim 1 wherein said housing includes a stainless steel end cap pressed into said housing and sealed with a silicone sealant, into which cap said housing opening is provided.

4. A flashlight with a temperature activated pressure relief mechanism according to claim 1 wherein said metallic eyelet is formed of copper.

5. A flashlight with a temperature activated pressure relief mechanism according to claim 1 wherein said eyelet is sealed to said housing with a non-corrosive sealant material.

6. A flashlight with a temperature activated pressure relief mechanism according to claim 1 wherein said eyelet is sealed to said housing with a non-corrosive sealant material selected from the group comprising: anaerobic sealants; epoxies; solvated plastics; and polysulfides.

7. A flashlight with a temperature activated pressure relief mechanism according to claim 1 wherein said eyelet is secured to said housing by a press fit whereby no adhesive is needed.

8. A flashlight with a temperature activated pressure relief mechanism according to claim 1 wherein said alloy melting temperature is approximately 100 degrees Celsius.

9. A flashlight with a temperature activated pressure relief mechanism according to claim 1 wherein said alloy melting temperature is approximately 100 degrees Celsius when using a Lithium/Iron Disulfide (Li/FeS2) "Energizer L91" battery.

10. A flashlight with a temperature activated pressure relief mechanism according to claim 1 wherein said alloy consists essentially of Bismuth (Bi), Lead (Pb) and Tin (Sn).

11. A flashlight with a temperature activated pressure relief mechanism according to claim 1 wherein said ahoy consists of approximately 52.5% by weight of Bismuth (Bi), 32% by weight of Lead (Pb) and 15.5% by weight of Tin (Sn).

12. A flashlight with a temperature activated pressure relief mechanism according to claim 1 wherein said alloy is selected on the basis of the type of batteries which are being used in the flashlight housing whereby an alloy is selected which will melt below the maximum temperature to which the battery may be safely heated.

13. A flashlight with a temperature activated pressure relief mechanism according to claim 1 wherein said eyelet opening has a diameter of approximately 1/16 inch.

14. A battery with a temperature activated pressure relief mechanism comprising:
   a) a watertight sealed battery housing, said housing having an outer surface and an inner surface, said housing having a housing opening which extends from said outer surface to said inner surface;
   b) a metallic eyelet having a cylindrical body sized to fit and placed tightly into said housing opening, said cylindrical body having an eyelet opening; and
   c) a fusible plug of a suitable alloy material placed into said eyelet opening whereby when said alloy material reaches the alloy melting point, said material will melt and flow at least partially out of said eyelet opening allowing gas pressure from within the sealed battery housing to vent to the outside through said eyelet opening.

15. A battery with a temperature activated pressure relief mechanism according to claim 14 wherein said eyelet has a flange portion which rests tightly upon said outer surface.

16. A battery with a temperature activated pressure relief mechanism according to claim 14 wherein said housing includes a stainless steel end cap pressed into said housing and sealed with a silicone sealant, into which cap said housing opening is provided.

17. A battery with a temperature activated pressure relief mechanism according to claim 14 wherein said metallic eyelet is formed of copper.

18. A battery with a temperature activated pressure relief mechanism according to claim 14 wherein said eyelet is sealed to said housing with a non-corrosive sealant material.

19. A battery with a temperature activated pressure relief mechanism according to claim 14 wherein said eyelet is sealed to said housing with a non-corrosive sealant material selected from the group comprising: anaerobic sealants; epoxies; solvated plastics; and polysulfides.

20. A battery with a temperature activated pressure relief mechanism according to claim 14 wherein said eyelet is secured to said housing by a press fit whereby no adhesive is needed.

21. A battery with a temperature activated pressure relief mechanism according to claim 14 wherein said alloy melting temperature is approximately 100 degrees Celsius.

22. A battery with a temperature activated pressure relief mechanism according to claim 14 wherein said alloy consists essentially of Bismuth (Bi), Lead (Pb) and Tin (Sn).

23. A battery with a temperature activated pressure relief mechanism according to claim 14 wherein said alloy consists of approximately 52.5% by weight of Bismuth (Bi), 32% by weight of Lead (Pb) and 15.5% by weight of Tin (Sn).

24. A battery with a temperature activated pressure relief mechanism according to claim 14 wherein an alloy is selected which will melt below the maximum temperature to which the battery may be safely heated.

25. A battery with a temperature activated pressure relief mechanism according to claim 14 wherein said battery also having a one way valve mechanism to relieve gas pressure from within the battery housing, wherein an alloy is selected which will melt below the maximum temperature to which the battery may be safely heated and whereby said temperature activated pressure relief mechanism acts as a backup mechanism in the event of a failure of said one way valve mechanism.

26. A flashlight with a temperature activated pressure relief mechanism according to claim 14 wherein said eyelet opening has a diameter of approximately 1/16 inch.

* * * * *